Figure 1:
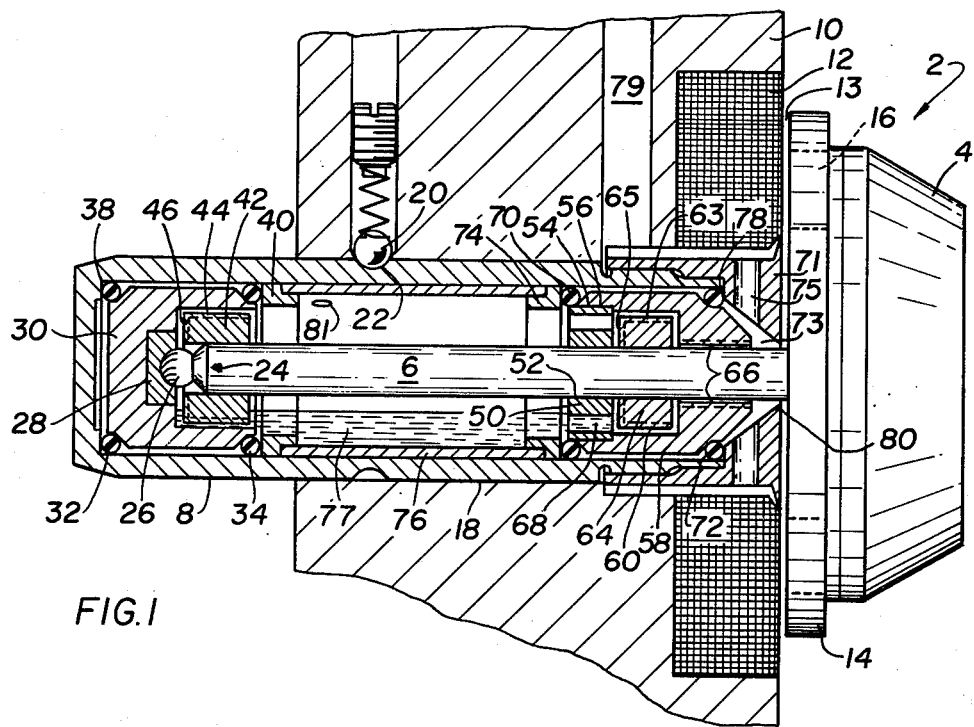

United States Patent

Pimiskern et al.

[11] 4,022,008
[45] May 10, 1977

[54] CENTRIFUGAL SPINNING UNIT AND BEARING ARRANGEMENT FOR THE SAME

[75] Inventors: Klaus Pimiskern, Daisendorf; Werner Herbert, Markdorf, both of Germany

[73] Assignee: Dornier System GmbH, Friedrichshafen, Germany

[22] Filed: Apr. 15, 1976

[21] Appl. No.: 677,325

[30] Foreign Application Priority Data

Apr. 23, 1975 Germany .......................... 2517973

[52] U.S. Cl. ................................ 57/100; 57/58.89; 57/134; 308/169; 308/172
[51] Int. Cl.² ...................... D01H 1/244; F16C 1/24
[58] Field of Search ............... 57/58.89, 100, 129, 57/133–135; 308/9, 168, 169, 172

[56] References Cited

UNITED STATES PATENTS

| | | | |
|---|---|---|---|
| 2,051,642 | 8/1936 | Magrath | 308/169 |
| 2,099,039 | 11/1937 | Taylor et al. | 308/169 X |
| 2,201,090 | 5/1940 | Hardy et al. | 308/169 |
| 2,499,075 | 2/1950 | Robinson et al. | 308/169 |
| 2,981,051 | 4/1961 | Maurer | 57/134 |
| 3,035,402 | 5/1962 | Westall et al. | 57/135 |
| 3,747,998 | 7/1973 | Klein et al. | 57/58.89 X |
| 3,799,630 | 3/1974 | Chisholm | 308/9 |
| 3,856,367 | 12/1974 | Wohnhaas et al. | 308/9 |
| 3,945,187 | 3/1976 | Widmer | 57/135 |

*Primary Examiner*—Richard C. Queisser
*Assistant Examiner*—Charles Gorenstein
*Attorney, Agent, or Firm*—Hans Berman

[57] ABSTRACT

A bearing arrangement for the pot of a centrifugal yarn spinning unit has a housing in whose cavity a radial bearing and an axial thrust bearing for the shaft of the pot are arranged. The radial bearing is fixedly mounted on a carrier which plugs an opening of the housing. The carrier is sealed to the housing by O-rings, and the shaft journaled in the bearings is received in a passage of the carrier provided with a packing in fixed spatial relationship with the radial bearing. Wear of the packing is minimized by the permanent guidance provided to the shaft by the radial bearing although the shaft may oscillate radially with the carrier during its high-speed rotation.

12 Claims, 3 Drawing Figures

CENTRIFUGAL SPINNING UNIT AND BEARING ARRANGEMENT FOR THE SAME

This invention relates to centrifugal spinning units, and particularly to a bearing arrangement for the spinning pot of a centrifugal spinning unit and to a unit including the bearing arrangement.

In its more specific aspects, this invention relates to an improvement in the spinning unit disclosed in the commonly owned application of Alfred Lauger and Jochen Schrade, Ser. No. 592,399, filed on July 2, 1975. It is a primary object of this invention to prevent the escape of lubricant from the bearing of the spinning unit toward the textile material being spun and the contamination of the spun yarn resulting from escaping lubricant even when the spinning pot of the unit is rotated at speeds in excess of 100,000 RPM.

The invention provides a bearing arrangement including an axial thrust bearing and a radial bearing in a cavity of a housing. A carrier forming a passage therethrough is aligned with the common axis of the two bearings and sealingly secured in an opening of the housing by resilient mounting elements which permit limited radial movement of the carrier and of the radial bearing fixedly mounted on the carrier. A shaft is journaled in the two bearings for rotation about their common axis and passes outward of the housing cavity through the passage in the carrier. An annular packing mounted in the passage in fixed spatial relationship to the radial bearing receives the shaft. The invention also relates to a spinning unit in which the housing of the bearing arrangement is secured in an aperture of a support, and a spinning pot is coaxially mounted on the shaft and driven by direct current supplied to a stator winding on the support cooperating with permanent magnets mounted in a bottom wall of the pot, the stator windings and the magnets defining the air gap of an electric motor.

Figure 2:
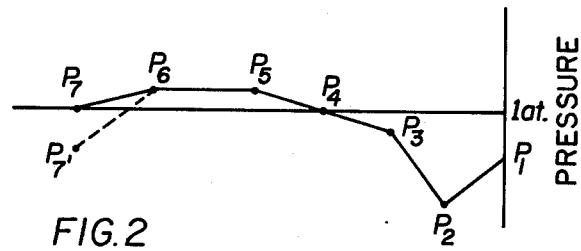
Figure 3:
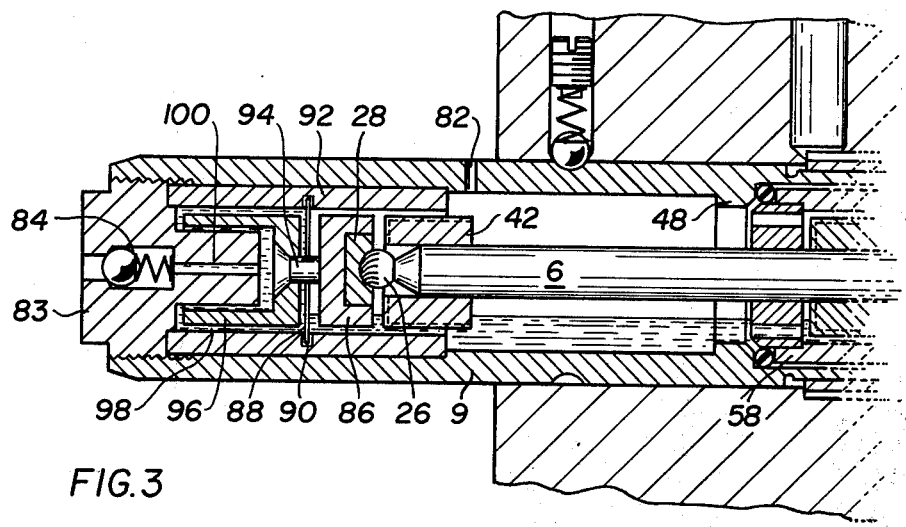

Other features, additional objects, and many of the attendant advantages of this invention will readily be appreciated as the same becomes better understood by reference to the following detailed description when considered in connection with the appended drawing in which:

FIG. 1 shows a centrifugal spinning unit of the invention in side elevational section on its axis;

FIG. 2 diagrammatically illustrates fluid pressures in several portions of the unit of FIG. 1; and FIG. 3 illustrates a modification of the spinning unit of FIG. 1 in a fragmentary corresponding view.

Referring now to the drawing in detail and initially to FIG. 1, there is seen the upright face plate 10 of a centrifugal spinning machine 2. A row of spinning pots 4 is arranged on the plate 10. Only one pot 4 and associated elements are shown in the drawing, the other units being practically identical. The pot 4 is coaxilly mounted on one axial end of a shaft 6 the major portion of which is received in a cylindrical housing 8. The housing is releasably supported in a bore 18 of the plate 10 and secured by a click stop arrangement mainly consisting of a springloaded bearing ball 20 received in a radial bore of the plate 10 and engaging a recess 22 in the outer, cylindrical wall of the housing 8.

The planar outer face of the plate 10 is recessed to receive the segment windings 12 of a direct-current motor which bond an axially narrow, radially open air gap 13 with the bottom wall 14 of the pot 4. Permanent magnets 16 are equiangularly spaced about the axis of rotation of the pot 4 and are set flush into the bottom wall 14. The magnetic circuit of the motor extending between the stator windings 12 and the magnets 16 is closed by an iron ring in the wall 14, not shown. The windings 12 are energized in timed sequence by an electronic commutator in a manner known in itself, the commutator being synchronized with the shaft 6 by a photoelectric sensor detecting a bright spot on the circumference of the pot 4 during each revolution of the latter. The drive for the shaft 6 and the pot 4 is more fully described in the afore-mentioned, commonly owned application.

During operaton of the electromotor, the end wall 14 is attracted toward the front plate 10 by the magnetic flux in the motor, and the resulting axial forces are transmitted by the shaft 6 to an axial thrust bearing 24 at the shaft end remote from the pot 4. The bearing is of the type described in U.S. Pat. No. 3,883,193 and consists mainly of a spirally grooved metal sphere 26 welded to the transverse end face of the shaft 6 and partly received in the spherically arcuate recess of a socket 28. The socket is fixedly and coaxially mounted in a cup-shaped carrier 30. A resilient O-ring 32 is radially interposed between the bottom wall of the carrier and the circular corner 38 defined by the axial wall of the housing 8 and the integral end wall which closes the housing in a direction away from the pot 4. A collar 40 in the housing 8 axially secures another O-ring 34 radially interposed between the rim portion of the carrier 30 and the housing 8.

The single rotor 42 of a screw pump is coaxially mounted on the shaft 6 adjacent the sphere 26. Its multiple circumferential threads 44 terminate in spiral grooves in a radial end face 46 of the rotor 42. The face 46 defines a radial plane closely adjacent the center of the sphere 26.

The housing 8 is cup-shaped about the axis of the shaft 6, and its otherwise open, axial end is closed by a plug 58 having the approximate shape of a cup whose bottom wall has a conically tapering outer face and is formed with a central passage. The plug 58 serves as a carrier for the bearing sleeve 50 of a radial sleeve bearing. The precisely machined outer circumferential face 54 of the sleeve 50 matingly engages an annular locating face 56 of the plug 58 adjacent the rim of the latter. The bore 52 of the sleeve 50 receives the shaft 6.

Axial bores 68 in the bearing sleeve 50 are open toward the thrust bearing 24 and communicate with a chamber 60 in the bottom part of the plug 58 in which the rotor 64 of a second screw pump is mounted on the shaft 6. The rotor 64 is equipped with helical circumferential threads 63 and spiral grooves 65 in its radial end face spacedly adjacent the bearing sleeve 50. The shaft 6 is secured in the bottom wall of the plug 58 by a packing 66 formed with helical grooves open toward the shaft and not capable of pictorial representation on the scale of FIG. 1.

The plug 58 is secured in the open end of the housing 8 by a cap 71 which axially overlaps the open end of the housing 8. The plug 58 is secured in the housing 8 by an O-ring 70 axially abutting against the radial rim face of the plug 58 abd radially interposed between a portion of the face 54, axially projecting from the plug 58 and the inner axial face of the housing 8. The O-ring 70 in turn is backed by a collar 74 identical with the afore-mentioned collar 40 and separated from the latter by a tubular, thin-walled spacer 76. A body 77 of lubricating oil fills the interior of the spacer 76 and communicating spaces in the housing 8 to a level below the horizontal shaft 6 when the latter stands still. The bottom wall of the plug 58 is mounted in the open end of the housing 8 by another O-ring 72 radially engaging the housing 8 and axially abutting against an annular face 78 of the cap.

The cap 71 is formed with a central opening 80 through which the shaft 6 passes freely, but with minimal clearance. The opening leads into a space 73, bounded by the outer conical face of the plug 58 and a spaced, internal conical face of the cap 71 from which radial bores 75 in the cap lead into communicating grooves in the outer cylindrical face of the cap. The grooves are open toward the atmosphere through a bore 79 in the front plate 10.

The illustrated spinning unit is particularly suitable for open-end spinning, a method in which a silver is fed to the open axial end of the pot 4 and an equal weight of a twisted yarn is simultaneously withdrawn from the pot. Open-end spinning is capable of operation at high pot speed, and the motor of the earlier application, partly illustrated and described herein, is capable of turning the shaft 6 and the pot 4 at a speed of more than 100,000 RPM. As is conventional in open-end spinning, the pressure near the pot is at a level of less than one atmosphere as indicated at $P_1$ in FIG. 2. Centrifugal forces in the narrow air gap 13 further reduce the fluid pressure there to a value of $P_2$. The partial vacuum prevailing at the narrow opening 80 of the cap 71 would draw lubricating oil from the housing 8 if the pressure $P_3$ in the space 73 were not held close to atmospheric pressure by air freely entering the bore 79.

The inclination of the non-illustrated helical grooves of the packing 66 is such that the rotating shaft 6 draws a small amount of air through the packing 66 into the chamber 60, the grooves preventing outward flow of oil through the packing while the shaft stands still. The pressure $P_4$ in the chamber 60 near the packing 66 thus is approximatelyequal to atmospheric pressure. Oil is picked up by the turning rotor 64 from the body 77 and driven through the threads 63 toward the bearing sleeve 50. The spiral grooves 65 of the rotor 64 lead the oil radially inward against the prevailing centrifugal forces toward the opening 52 to lubricate the radial sleeve bearing at the superatmospheric pressure $P_5$. Any excess of oil passes through the bores 68 in the sleeve 50 into the interior of the spacer 76. Air pressure $P_6$ within the spacer 78 is relieved through a throttling opening 81 which leads to the atmosphere at pressure $P_7$ through an oil separator, conventional and not shown. The air drawn into the housing 8 from the atmosphere through the bore 79 is thus discharged through the opening 81 and stripped of a small amount of entrained lubricant droplets. The lubricant body 77 in the housing 8 is replenished only infrequently. If so desired, a suction pump may be arranged after the oil separator so that the fluid pressure at the discharge end of the separator has a subatmospheric value $P_7$.

The thrust bearing 24 is provided with lubricant under pressure by the screw pump constituted by the rotor 42 and the spacedly enveloping inner wall of the carrier 30 and holds the width of the air gap 13 at a constant small value.

The modified spinning unit illustrated in FIG. 3 is largely identical with that described above with reference to FIGS. 1 and 2, and identical or practically identical elements have been designated by the same reference numerals as in FIG. 1 or not provided with any numerals. Structure omitted from FIG. 3 is identical with corresponding structure in FIG. 1.

The housing 9 which replaces the afore-described housing 8 is a generally cylindrical tube open in both axial directions. A plug 58, identical with that described with reference to FIG. 2 and carrying the same operating elements, is mounted in one axial end of the housing 9 in the manner described above, but is secured in an axial direction inward of the housing 9 by an integral collar 48 of the housing.

A heavy-walled sleeve 92 is conformingly received in the end of the housing 9 near the thrust bearing 26, 28 and is axially secured between a shoulder on the inner wall of the housing and a plug 83 threadedly fastened in the orifice of the tube and having a reduced stem portion which extends into the sleeve 92. The circumference of a circular, flexible diaphragm 88 is secured in a groove 90 in the sleeve 92. A rigid pin 94 is attached to the diaphragm and projects axially from both major faces of the diaphragm. One end of the pin 94 is fixedly fastened to a cylindrical carrier 86 in which the socket 28 of the axial thrust bearing for the shaft 6 is received. The thrust bearing also includes a spirally grooved metal sphere 26 on the shaft and a screw pump rotor 42 as described above. The rotor 42 cooperates with the spacedly enveloping sleeve 92 to provide the lubricant pressure necessary for maintaining an oil film between the engaged surfaces of the sphere 26 and the socket 28 at the high operating speed of the shaft 6.

The bottom of a cup-shaped damping element 96 is coaxially mounted on the other end of the pin 94. The shape and dimensions of the element 96 are such that it is separated from the diaphragm 88, the sleeve 92, and the plug 83 by a narrow gap 98 filled with a viscous oil. The damping fluid may be replenished, if necessary, through an axial, central duct 100 in the plug 83 which is normally sealed by a check valve 84. A vent opening 82 in the housing 9 may lead to the atmosphere directly or through an oil separator as described above.

It is an important advantage of both illustrated embodiments of the invention that the shaft 6 may pivot to some extent about the center of the sphere 26. Yet, the shaft is always precisely centered in the packing 66 regardless of its angular position because the plug 58 on which the packing 66 is mounted is fixedly fastened to the radial bearing sleeve 50. The packing may be designed for minimal shaft clearance, and such clearance is maintained unchanged after long, high-speed operation. The plug as a whole may move slightly in a radial direction due to the compressibility of the O-rings 70, 72, and such movement is necessary for automatically compensating for slightly non-uniform loading of the pot 4. Both illustrated thrust bearing arrangements are axially very rigid, and more rigid than in a radial direction to maintain the desired constant air gap 13 in the magnetic circuit of the driving motor.

It is further advantage of the invention that the escape of oil from the housing 8, 9 through the opening 80 of the housing cap 71 toward the pot 4 is impossible both during normal rotation of the shaft 6 and during idling periods, thereby avoiding oil stains on the spun yarn.

Spinning units equipped with the bearings illustrated in FIGS. 1 and 3 have been found to operate silently and without need for periodic maintenance at speeds in excess of 100,000 RPM for extended periods. Friction in the bearing is so low as not to consume a significant amount of energy. An important feature contributing to energy savings is the low oil level in the housings 8, 9. The horizontal shaft 6 is never in contact with the reserve body of oil, and the energy consuming dispersion of oil in air-borne droplets by the shaft characteristic of some known bearings in centrifugal spinning machines is held to a minimum.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A spinning unit comprising:
   a. a support formed with an aperture and having a face about said aperture;
   b. a bearing arrangement including:
      1. a housing defining a cavity and formed with an opening communicating with said cavity;
      2. an axial thrust bearing and a radial bearing in said cavity having a common axis passing through said opening,
      3. a carrier member formed with an axial passage therethrough,
      4. resilient mounting means radially interposed between said carrier member and said housing and sealingly securing the carrier member in said opening for limited radial movement, said radial bearing being fixedly mounted on said carrier member,
      5. a shaft journaled in said bearings for rotation about said common axis and passing outward of said cavity through said passage, and
      6. annular packing means mounted in said passage in fixed spatial relationship to said radial bearing and receiving said shaft;
   c. means securing said housing in said aperture, said shaft projecting outward of said support from said aperture;
   d. a spinning pot coaxially mounted on said shaft, said spinning pot having a bottom wall spacedly parallel to said face of said support; and
   e. electrically operable drive means for rotating said shaft and said pot about said axis, said drive means including a stator winding on said support and a plurality of permanent magnets mounted in said bottom wall, said stator winding and said magnets axially defining an air gap therebetween.

2. An arrangement as set forth in claim 1, wherein said axial thrust bearing includes a spherical bearing member mounted on said shaft and a socket member mounted on said housing, said bearing member having a grooved face portion conformingly received in a recess of said socket member.

3. A unit as set forth in claim 2, wherein said housing and said shaft bound a permanently open, annular orifice of said opening offset from said passage in a direction away from said axial thrust bearing.

4. A unit as set forth in claim 2, wherein said carrier member is formed with a radially sealed chamber axially defined in one direction by said radial bearing and extending to said passage in the other direction, said shaft passing through said chamber and carrying therein a rotor, said rotor being the movable element of screw pump means for pumping fluid toward said radial bearing.

5. A unit as set forth in claim 4, wherein said housing is formed with a vent opening axially intermediate said bearings.

6. A unit as set forth in claim 2, further comprising resilient securing means securing said socket member to said housing for limited movement.

7. A unit as set forth in claim 6, further comprising damping means for damping said movement of said socket member.

8. A unit as set forth in claim 7, wherein said securing means include a flexible diaphragm attached to said housing and carrying said socket member, and said damping means include a damping member mounted on said diaphragm, means on said housing defining a gap enveloping said damping member, and a viscous fluid substantially filling said gap.

9. A unit as set forth in claim 2, further comprising screw pump means drivingly connected to said shaft intermediate said bearings for pumping lubricant under pressure to said face portion of said spherical bearing member.

10. A bearing arrangement comprising:
    a. a housing defining a cavity and formed with an opening communicating with said cavity;
    b. an axial thrust bearing and a radial bearing in said cavity having a common axis passing through said opening;
    c. a carrier member formed with an axial passage therethrough;
    d. resilient monting means radially interposed between said carrier member and said housing and sealingly securing the carrier member in said opening for limited radial movement, said radial bearing being fixedly mounted on said carrier member;
    e. a shaft journaled in said bearings for rotation about said common axis and passing outward of said cavity through said passage,
       1. said carrier member being formed with a radially sealed chamber axially defined in one direction by said radial bearing and extending to said passage,
       2. said shaft passing through said chamber and carrying thereon a rotor,
       3. said rotor being the movable element of screw pump means for pumping fluid toward said radial bearing; and
    f. annular packing means mounted in said passage in fixed spatial relationship to said radial bearing and receiving said shaft.

11. An arrangement as set forth in claim 10, wherein said axial thrust bearing includes a spherical bearing member mounted on said shaft and a socket member mounted on said housing, said bearing member having a grooved face portion conformingly received in a recess of said socket member.

12. A bearing arrangement comprising:
    a. a housing defining a cavity and formed with an opening communicating with said cavity;
    b. an axial thrust bearing and a radial bearing in said cavity having a common axis passing through said opening,
       1. a spherical bearing member mounted on said shaft,
       2. a socket member, said bearing member having a grooved face portion conformingly received in a recess of said socket member,
       3. a flexible diaphragm attached to said housing and carrying said socket member, 4. a damping member mounted on said diaphragm,
   5. means on said housing defining a gap enveloping said damping member, and
   6. a viscous fluid substantially filling said gap;
c. a carrier member formed with an axial passage therethrough;
d. resilient mounting means radially interposed between said carrier member and said housing and sealingly securing the carrier member in said opening for limited radial movement, said radial bearing fixedly mounted on said carrier member;
e. a shaft journaled in said bearings for rotation about said common axis and passing outward of said cavity through said passage. and
f. annular packing means mounted in said passage in fixed spatial relationship to said radial bearing and receiving said shaft.

* * * * *